United States Patent [19]
Beasley

[11] Patent Number: 6,055,426
[45] Date of Patent: Apr. 25, 2000

[54] NOTIFICATION OF A MOBILE UNIT OUT OF COVERAGE

[75] Inventor: Dale E. Beasley, Flower Mound, Tex.

[73] Assignee: HighwayMaster Communications, Inc., Dallas, Tex.

[21] Appl. No.: 08/876,965

[22] Filed: Jun. 17, 1997

[51] Int. Cl.[7] .................................................. H04Q 7/20
[52] U.S. Cl. ........................................ 455/432; 455/427
[58] Field of Search ................................... 451/421, 432, 451/427, 456, 422, 435

[56] References Cited

U.S. PATENT DOCUMENTS

| | | | |
|---|---|---|---|
| 5,043,736 | 8/1991 | Darnell et al. | 342/357 |
| 5,235,633 | 8/1993 | Dennison et al. | 379/60 |
| 5,343,512 | 8/1994 | Wang et al. | 455/410 |
| 5,365,451 | 11/1994 | Wang et al. | 364/449 |
| 5,369,684 | 11/1994 | Buhl et al. | 379/59 |
| 5,394,561 | 2/1995 | Freeburg | 455/13.1 |
| 5,396,540 | 3/1995 | Gooch | 379/59 |
| 5,422,813 | 6/1995 | Schuchman et al. | 364/449 |
| 5,444,450 | 8/1995 | Olds et al. | 342/357 |
| 5,448,623 | 9/1995 | Wiedeman et al. | 379/59 |
| 5,454,027 | 9/1995 | Kennedy et al. | 379/60 |
| 5,500,648 | 3/1996 | Maine et al. | 342/357 |
| 5,502,757 | 3/1996 | Bales et al. | 379/58 |
| 5,513,242 | 4/1996 | Mukerjee et al. | 455/435 |
| 5,519,760 | 5/1996 | Borkowski et al. | 379/59 |
| 5,526,404 | 6/1996 | Wiedeman et al. | 379/60 |
| 5,528,247 | 6/1996 | Nonami | 342/357 |
| 5,539,810 | 7/1996 | Kennedy, III et al. | 379/59 |
| 5,544,225 | 8/1996 | Kennedy, III et al. | 379/59 |
| 5,579,376 | 11/1996 | Kennedy, III et al. | 379/60 |
| 5,734,981 | 3/1998 | Kennedy, III et al. | 455/445 |
| 5,771,455 | 6/1998 | Kennedy, III et al. | 455/456 |
| 5,794,143 | 8/1998 | McCarthy et al. | 455/422 |
| 5,799,249 | 8/1998 | Kennedy, III et al. | 455/411 |
| 5,815,809 | 9/1998 | Ward et al. | 455/432 |

FOREIGN PATENT DOCUMENTS

WO 96/29831  9/1996  WIPO .............. H04Q 7/22

OTHER PUBLICATIONS

"EIA/TIA Interim Standard—Cellular Radio–Telecommunications Intersystem Operations: Automatic Roaming," EIA/TIA/IS–41.3–B, *Electronic Industries Association Engineering Department*, Dec., 1991, 64 pages and table of contents.

"EIA/TIA Interim Standard—Cellular Radiotelecommunications Intersystem Operations: Functional Overview," EIA/TIA/IS–41.1–B, Electronic Industries Association Engineering Department, Jan., 1992, 14 pages and table of contents.

"EIA/TIA Interim Standard—Cellular Radiotelecommunications Intersystem Operations: Intersystem Handoff," EIA/TIA/IS–41.2–B, Electronic Industries Association Engineering Department, Jan., 1992, 25 pages and table of contents.

"EIA/TIA Interim Standard—Cellular Radiotelecommunications Intersystem Operations: Automatic Roaming," EIA/TIA/IS–41.3–B, Electronic Industries Association Engineering Department, Jan., 1992, 58 pages and table of contents.

Mouly et al., "The GSM System for Mobile Communication–XP–002081723—The IMSI Attach and Detach Procedures," GSM System for Mobile Communications, 1993 pp. 474–477.

PCT Search Report in PCT/US 98/11618, dated 11/11/98, 7 pages.

(List continued on next page.)

*Primary Examiner*—Dwayne D. Bost
*Assistant Examiner*—Myron K. Wyche
*Attorney, Agent, or Firm*—Baker & Botts, L.L.P.

[57] ABSTRACT

A communication system includes a mobile unit that communicates with a platform using a cellular telephone network or a data communication network. The mobile unit informs the platform when it is out of coverage or out of service to reduce or eliminate unsuccessful attempts to communicate with the mobile unit. The communication system also supports the transmission of data using the data communication network.

32 Claims, 8 Drawing Sheets

OTHER PUBLICATIONS

"EIA/TIA Interim Standard—Cellular Radiotelecommunications Intersystem Operations: Operations, Administration, and Maintenance," EIA/TIA/IS–41.4 *Industries Association Engineering Department,* Jan., 1992, 29 pages and table of contents.

"EIA/TIA Interim Standard—Cellular Radiotelecommunications Intersystem Operations: Data Communications, "EIA/TIA/IS–41.5–B, *Electronic Industries Association Engineering Department,* Jan., 1992, 84 pages and table of contents.

NOTIFICATION OF A MOBILE UNIT OUT OF COVERAGE

TECHNICAL FIELD OF THE INVENTION

This invention relates generally to the field of telecommunications, and more particularly to the notification of a mobile unit out of coverage.

BACKGROUND OF THE INVENTION

Developments in communications in our increasingly mobile society has resulted in the introduction of mobile units that provide mobile communication and processing capabilities. A network of cellular telephone systems is a suitable conduit for communications with mobile units associated with people, vehicles, cargo containers, or other mobile items. However, the cost of using traditional cellular communication is prohibitive, both in terms of chargeable air time and roamer fees. This is especially true in applications such as nationwide trucking, where mobile units move through a number of cellular systems.

Existing systems require a failed attempt to the last known cellular system before attempting communication using other techniques. This often contributes to increased costs associated with failed communication attempts or delayed transmission of information to or from the mobile unit. Yet another problem with using a cellular network for communication with mobile units is that cellular systems may not realize that a mobile unit has powered down. Failed attempts to a powered down mobile unit often contribute to increased costs.

SUMMARY OF THE INVENTION

A need has arisen for a communication system that reduces or eliminates failed or delayed communication attempts with mobile units by notifying a platform when a mobile unit is out of coverage of the cellular telephone network or out of service.

In one embodiment of the present invention, a communication system includes a mobile unit coupled to a cellular telephone network and a data communication network. The mobile unit transmits, using the data communication network, an indication that the mobile unit will no longer receive service from the cellular telephone network. A platform, coupled to the cellular telephone network and the data communication network, receives the indication that the mobile unit will no longer receive service from the cellular telephone network and, in response, ceases attempts to communicate with the mobile unit using the cellular telephone network.

In another embodiment of the present invention, a mobile unit includes a cellular telephone coupled to a cellular telephone network and a data transmitter coupled to a data communication network. A processor coupled to the cellular telephone network and the data transmitter determines that the cellular telephone will no longer receive service from the cellular telephone network and, in response, directs the data transmitter to transmit an indication that the mobile unit will no longer receive service from the cellular telephone network.

In yet another embodiment of the present invention, a telecommunication platform includes a first link coupled to a cellular telephone network that can communicate with a mobile unit equipped with a cellular telephone. A second link receives a call to be delivered to the mobile unit. A data receiver, coupled to a data communication network, receives an indication that the mobile unit will no longer receive service from the cellular telephone network. A processor coupled to the data receiver prevents delivery of the call to the mobile unit upon reception of the indication that the mobile unit will no longer receive service from the cellular telephone network.

Technical advantages of the present invention include a communication system and technique that reduces or eliminates failed or delayed communication attempts with mobile units by notifying a platform when a mobile unit is out of coverage of the cellular telephone network or out of service. This is accomplished by transmitting a message or indication from the mobile unit upon determining that the mobile unit will no longer receive service from the cellular telephone network, either as a result of loss of coverage or power down of the mobile unit. The indication may include geographic position of the mobile unit as well as cellular telephone system information regarding the last cellular telephone system providing service to the mobile unit. Upon receiving this indication of out of coverage or out of service, the platform may prevent delivery of voice calls, data transmissions, or other communications with the mobile unit over the cellular telephone network.

Another technical advantage of the present invention is the use of a data communication network to provide an indication to the platform that the mobile unit is out of coverage or out of service. This architecture may be satellite-based or land-based, and provides a convenient and effective technique to inform the platform of the mobile unit status. Moreover, the platform and mobile unit may continue to exchange data using an alternate communication path supported by the data communication network depending on a determined priority of the data. Other technical advantages are readily apparent from one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Figure 1:
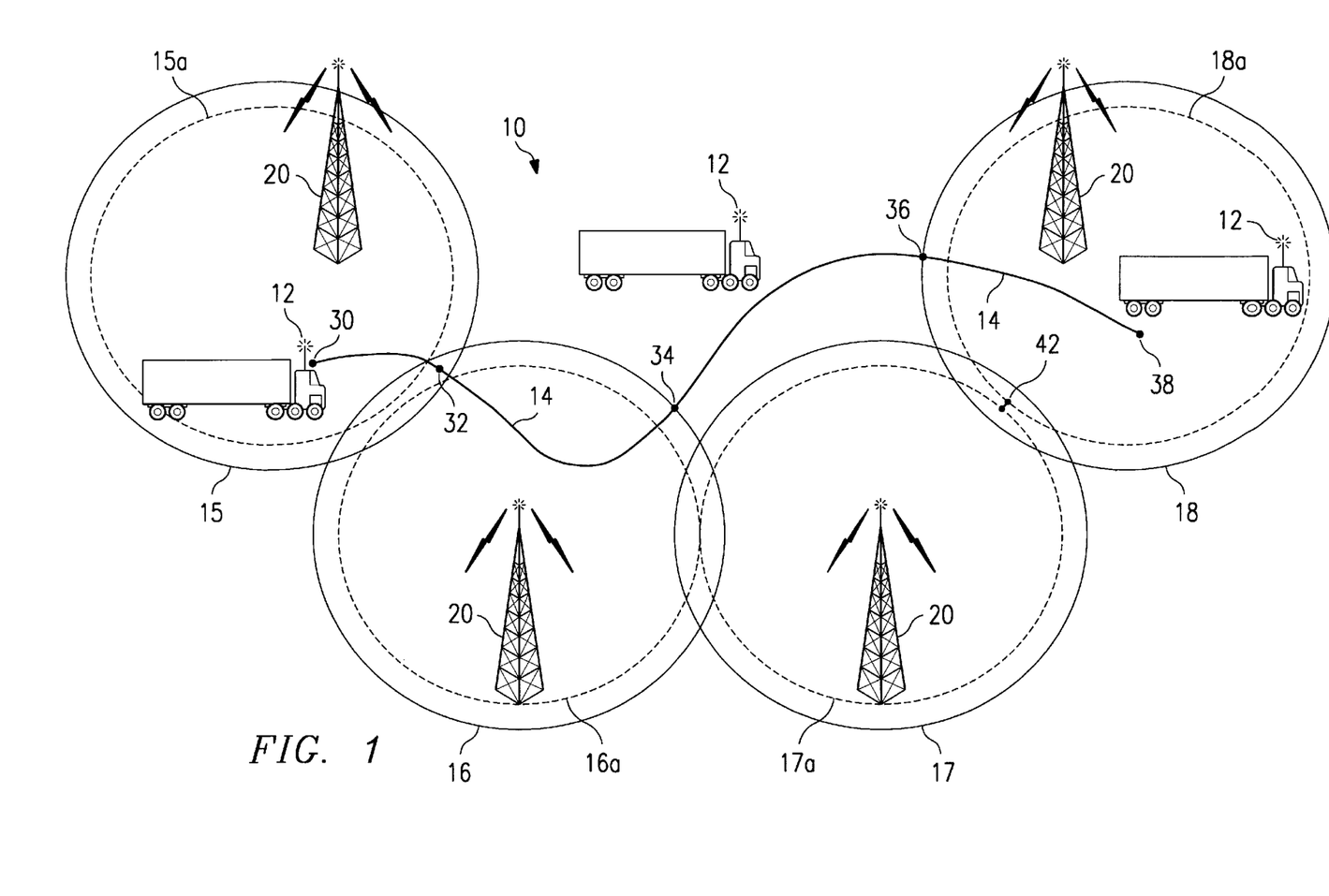
FIG. 1 illustrates a path of a mobile unit traveling through a communication system in accordance with the present invention.

FIG. 1 is a block diagram of a communication system 10 which may be part of a larger communication network that also includes land-based, satellite, or other forms of communication. System 10 includes numerous cellular telephone systems, represented by cellular systems 15, 16, 17 and 18 (referred to generally as cellular system 15). A mobile unit 12 follows a route 14 through system 10. It is understood that many mobile units 12 may be present in various locations of system 10. Mobile unit 12 may be associated with a car, truck tractor, truck trailer pulled by a tractor or carried by a barge, train, other suitable transportation system or vehicle, mobile cargo containers, persons, or other mobile items.

It is further understood that system 10 may include any suitable type of communication components, such as a specialized mobile radio (SMR) system, a personal communication services (PCS) system, or any other suitable communications system. Furthermore, system 10 may comprise land-based transmission towers, space-based satellite transponders, or a combination of communications hardware in space or on land. Transmissions over network 10 may be analog or digital using any suitable modulation technique or protocol.

Generally, mobile unit 12 contains a cellular transceiver for sending and receiving data and voice messages to and from transmission towers 20 located within cellular systems 15. Mobile unit 12 is also equipped with a data transceiver for communication of messages when system 10 does not provide service, for example, mobile unit 12 is not within the coverage provided by system 10. The present invention provides a method and apparatus for mobile unit 12 to transmit a notification when it is about to leave cellular coverage or go out of service. This advantageously reduces the number of failed communication attempts to mobile unit 12.

In operation, mobile unit 12 registers with each new cellular system 15 as it travels throughout system 10. The present invention adds to mobile unit 12 the capability to transmit a notification when it leaves cellular coverage or go out of service. Positions 30, 32, 34, 36, and 38 of FIG. 1 illustrate the operation of the present invention as mobile unit 12 travels along route 14 through system 10.

Mobile unit 12 powers up at position 30 and monitors the system identification number ("SID") of the particular cellular system 15 in which it is located (if any). This SID, as is generally known in the art, is periodically issued by the cellular system in the overhead message stream ("OHMS"). Upon power up at position 30, mobile unit 12 identifies that it is located in cellular system 15. Accordingly, mobile unit 12 registers its presence in cellular system 15 by issuing a present message.

Mobile unit 12 may issue a present message using the SS-7 signaling network and a registration protocol as defined in Interim Standard 41 (IS-41) or its variants. U.S. Pat. No. 5,539,810 entitled "Data Messaging in a Communications Network," which is hereby incorporated by reference for all purposes, describes several techniques to issue a present message, including transmission of a "*19" feature request. In addition, mobile unit 12 may use any suitable voice or data channel to notify a platform of its location or status. Mobile systems presently use "*19" to clear the roaming status of a cellular phone. However, systems set up to monitor a fleet of trucks may have arrangements with individual cellular systems. In such cases, mobile units 12 need not register their presence for purposes of roaming in particular cellular systems, but need only register their location with a centralized platform or host. Since "*19" is a message that cellular systems take no action on, location or status information may be embedded in the "*19" message to reduce costs associated with the use of system 10.

Mobile unit 12 travels along route 14 to position 32, where the coverage of cellular systems 15 and 16 overlap. When the OHMS signal from transmission tower 20 associated with cellular system 16 becomes stronger than the OHMS signal from transmission tower 20 associated with cellular system 15, mobile unit 12 issues another present message to register its presence in cellular system 16.

Mobile unit 12 continues along route 14 to position 34, where mobile unit 12 leaves cellular coverage. This may occur, for example since certain areas of the country are not being covered by any cellular service. In addition, it is possible that mobile unit 12 may be entering an area covered by a cellular system that mobile unit 12 has not arranged to use. Once mobile unit 12 experiences a loss in communication with cellular system 16 (e.g., an OHMS signal below the threshold required for successful cellular communication) mobile unit 12 issues an out of coverage notification. Alternatively or in addition, mobile unit 12 may have a positioning system (e.g., GPS or Loran-C) and a database map with geographical coverage coordinates of cellular systems 15. Mobile unit 12 may compare a position fix to coordinates of cellular systems 15, and initiate a message in response.

An important technical advantage of the present invention is that out of coverage notifications may reduce or eliminate costs associated with failed communication attempts to mobile unit 12 while it is out of cellular coverage. As discussed in more detail below, a platform may cease communication attempts with mobile unit 12 using communication system 10 switch to an alternate communication path to transmit voice or data messages, store voice or data messages for later transmission, or instruct the caller or sender to try again later. Furthermore, other information, such as status information, can be sent with this out of coverage notification. Another important technical advantage of the present invention is the fact that the out of coverage notification may be sent automatically, and with a minimum of cellular air time, thus providing significant cost savings.

Mobile unit 12 continues along route 14 until it detects entry into cellular system 18 by sensing the OHMS signal providing the SID associated with cellular system 18 at position 36. Mobile unit 12 issues a present message that enables cellular communications to and from mobile unit 12 using system 10. Mobile unit 12 continues along route 14 to position 38 where it powers down. The power down procedure may be preceded by issuing an out of service notification. Another important technical advantage of the present invention is that the out of service notification may reduce or eliminate costs associated with failed communication attempts using the cellular network while mobile unit 12 is powered down. Without such a notification, external components may make failed communication attempts to mobile unit 12 since it is still registered and associated with a specific SID. Further savings may be achieved by the transmission of an out of service notification using a data communication network when mobile unit 12 is out of cellular coverage. This may prevent failed communication attempts over the data communication network. In addition, the out of service message may be sent automatically, and with a minimum of cellular air time or data communication costs, and may include additional information on the location or status of mobile unit 12.

Figure 2:
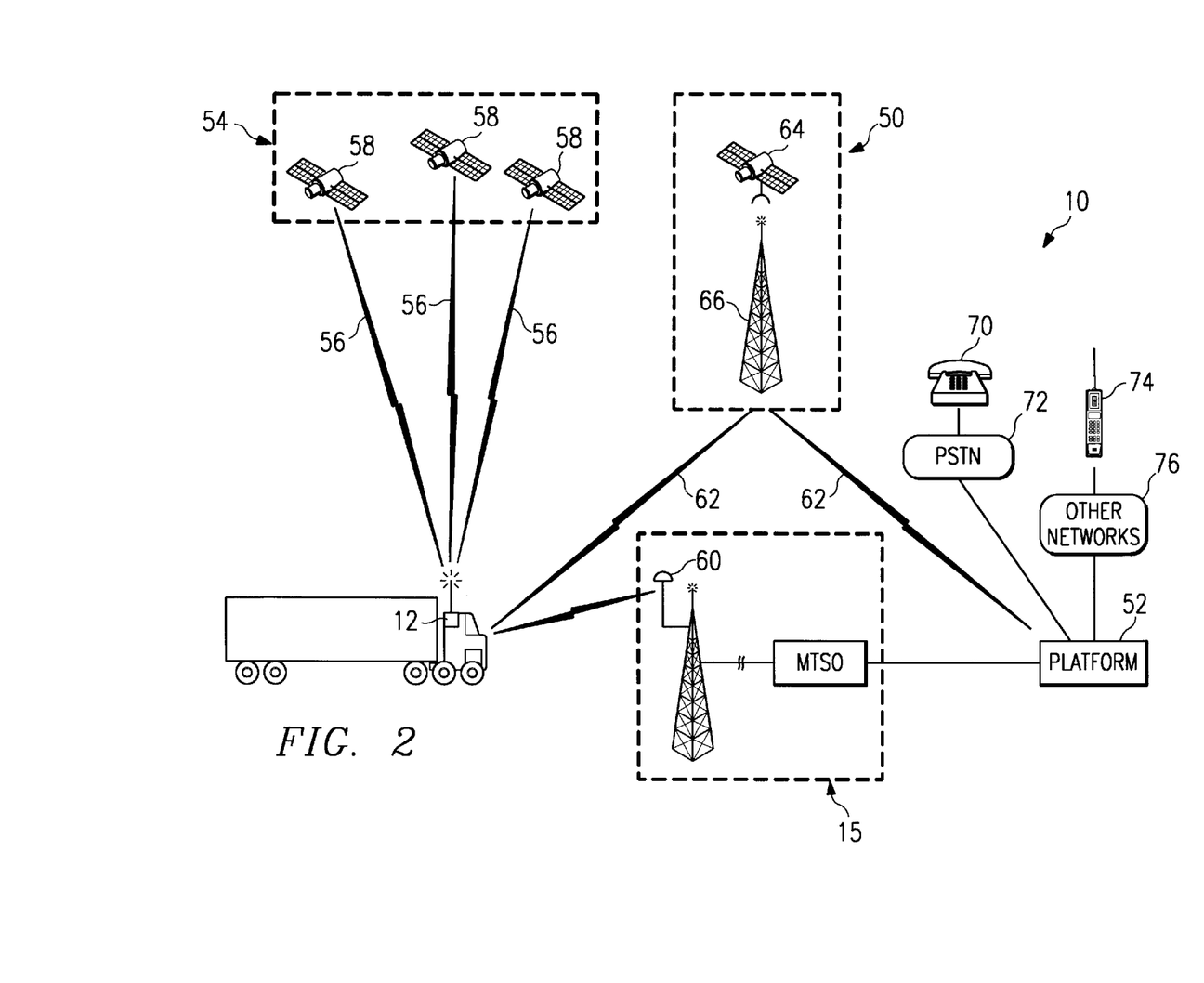
FIG. 2 illustrates in more detail components of the communication system.

FIG. 2 illustrates in more detail components of system 10. System 10 includes a data communication network 50, a platform 52, components of cellular system 15, a positioning system 54, and other communication devices.

Mobile unit 12 equipped with a positioning receiver may obtain position information from positioning system 54, which may be satellite-based or land-based. In a particular embodiment, mobile unit 12 receives position information over position information streams 56 from a plurality of satellites 58. The position information comprises accurate satellite location information and pseudorange data represented by the time of arrival of position information streams 26 to mobile unit 12.

Positioning system 54 is illustrated as a satellite-based radio navigation system such as the NAVSTAR global positioning system (GPS). The NAVSTAR GPS is a representative positioning system 54, but any land-based or satellite-based system may be used. For example, positioning system 54 may be a land-based LORAN-C, a space-based GLONASS, or any other system using radio frequency (RF) triangulation positioning technology. Positioning system 54 can represent spaced-based or land-based transmitters that emit position information. In addition, positioning system 54 can be a network of roadside positional tags that can be detected by a reading device on the vehicle.

Satellites 58 maintain accurate and synchronized time and simultaneously transmit position information that contains satellite specific and system information. The position information transmitted by satellites 58 includes high precision clock and ephemeris data for a particular satellite, low precision clock and ephemeris data for every satellite in a constellation ("almanac data"), health and configuration status for all satellites, user text messages, and other parameters describing operation of positioning system 54.

Positioning system 54 can include additional satellites and one or more positioning receivers. In one embodiment, a positioning receiver 60 may be associated with cellular system 15 to implement differential GPS techniques. Positioning receiver 60 generates correction data that enables mobile unit 12 to more accurately determine its position. Positioning receiver 60 transmits the correction data to mobile unit 12 over any suitable link, including a link supported by cellular system 15.

Mobile unit 12 can also generate position information using an on-board positioning sensor. For example, an inertial navigation sensor on the vehicle integrates accelerations imparted to the vehicle to determine current position. A dead reckoning sensor computes vehicle location based on compass orientation and distance traveled at that orientation. A dead reckoning sensor includes a direction finder, such as a compass, integrated with a distance sensor, such as an odometer or tire rotation counter, to track the location of mobile unit 12 and determine its current position. Mobile unit 12 can also include a device to read roadside positional tags to determine its location.

Mobile unit 12 communicates notifications over data link 62 of data communication network 50 to platform 52. Data communication network 50 represents any type of data messaging or paging network, using land-based or spaced-based transceivers, repeaters, or transmitters, that supports communication of data from mobile unit 12 to platform 52. A spaced-based data messaging system uses one or more satellites 64 that receive communications from mobile unit 12 and retransmit the communications to platform 52. The satellites may be in geostationary orbit, low earth orbit (LEO), or any other configuration, and may utilize any suitable frequency band of communications. A land-based data communication network includes one or more land-based transmitters 66 that communicate data over dedicated or public switched data lines. For example, land-based transmitter 66 may be a component of the land-line or mobile public switched telephone network (PSTN), a communication link such as a T1 trunk, the SS7 backbone infrastructure of the PSTN, a private data network, a private paging network, or any other suitable data communication network. Data communication network 50 represents one or a combination of the data messaging technologies discussed above.

The choice of a proper data communications technology depends on several considerations. The chosen data communication network 50 should provide coverage in areas traveled by mobile unit 12. In addition, data communication network 50 should provide inexpensive data communications that can handle relatively small data packages containing out of coverage or out of service notifications. Based on these constraints of coverage area and expense, system 10 can use one or a combination of the data communications technologies mentioned above.

Upon receipt of notifications transmitted by mobile unit 12 over data communication network 50, platform 52 stores the information indexed by or identified with a particular mobile unit 12. As described below, this information includes the current status of mobile unit 12 (e.g., active, out of coverage, out of service), the current or most recent SID of cellular system 15 servicing mobile unit 12, and data to be delivered to or received from mobile unit 12.

System 10 supports calls placed to mobile unit 12 from a variety of callers 70 and 74, collectively represented by an exemplary caller 70, using a variety of communications technology. The call can originate from a caller 70 serviced by the public switched telephone network (PSTN) 72. PSTN 72 includes traditional land-line telephone networks and the network of cellular telephone systems. Using PSTN 72, caller 70 directs the call to platform 52 by inputting a traditional telephone number associated with platform 52 or mobile unit 12. In one embodiment, caller 70 inputs a 1+800 number to connect to platform 52. A caller 74 can initiate calls to mobile unit 12 using other communication networks 76, such as a specialized mobile radio (SMR), enhanced specialized mobile radio (ESMR), a personal communications service (PCS), a citizens band (CB), a dedicated radio system, such as those used by police and firefighters, or any other suitable communications link that allows caller 74 to direct a call to platform 52. Furthermore, platform 52 itself can initiate calls to mobile unit 12.

After receiving a call for mobile unit 12 from caller 70, platform 52 performs a database look-up or other processing to determine the status of mobile unit 12. This is performed by accessing information maintained at platform 52 regarding the status of mobile units 12 in system 10. Depending on the status of mobile unit 12, platform 52 can cease communication attempts with mobile unit 12 using cellular system 15, switch to the communication of voice or data messages using data communication network 50, store voice or data messages for later transmission, or instruct the caller or sender to try again later.

If appropriate, platform 52 directly dials mobile unit 12 if it has received or can compute a direct dial number for mobile unit 12. Platform 52 may also establish a communication link with mobile unit 12 through a two-step dialing method using a roamer access port (RAP) or other communications port of the communications service provider of mobile unit 12. Using the RAP, platform 52 dials the communications service provider, receives a new dial tone, and then dials the specific number for mobile unit 12.

Platform 52 may also establish communication with mobile unit 12 using suitable out-of-band signaling protocols, such as those supported by IS-41.

Figure 3:
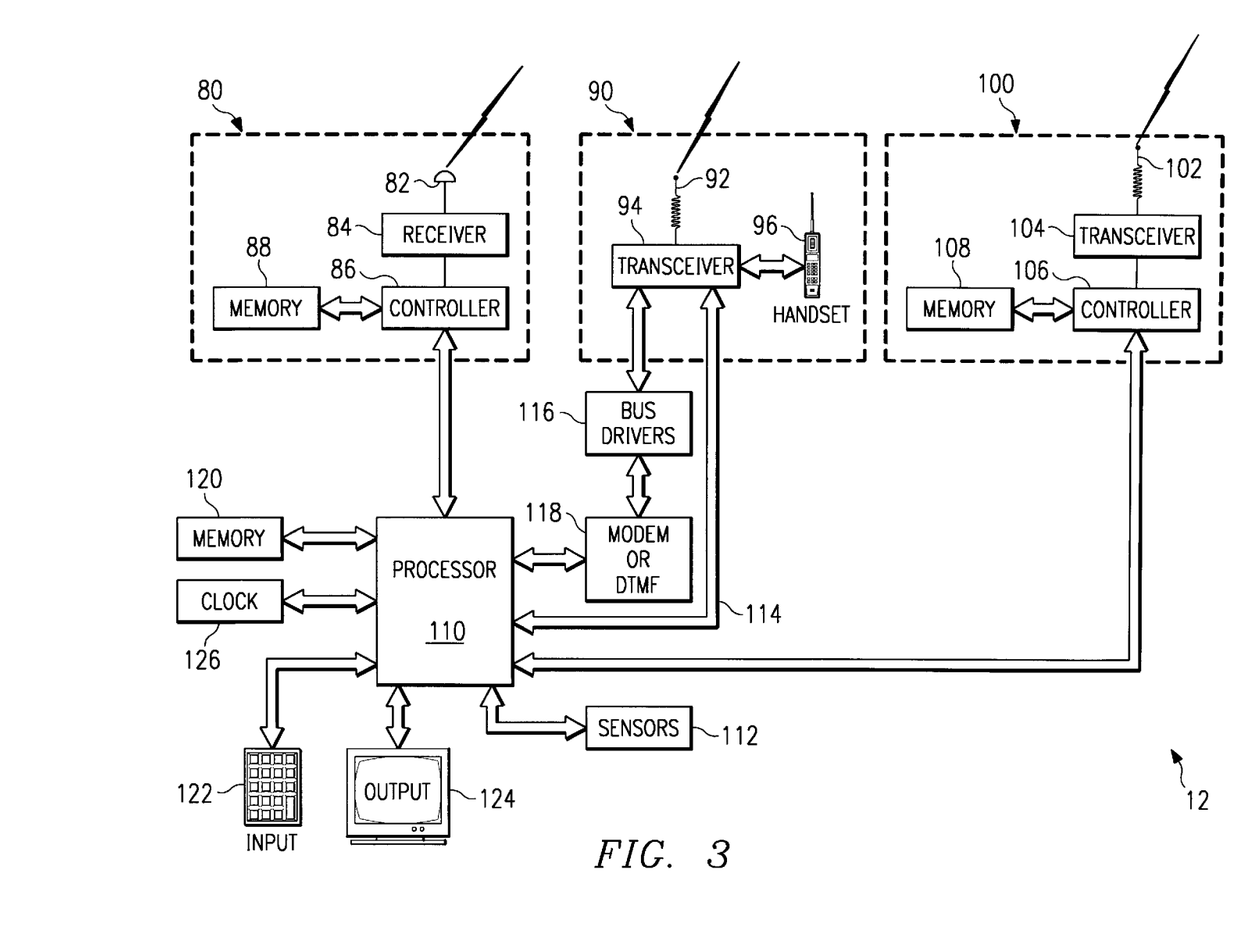
FIG. 3 is a schematic representation of a mobile unit in the communication system.

FIG. 3 is a schematic representation of mobile unit 12. Mobile unit 12 includes mobile positioning receiver 80, mobile voice communications device 90, data transceiver 100, and other associated hardware and software, described below.

Mobile positioning receiver 80 includes antenna 82, receiver 84, controller 86, and memory 88. In operation, mobile positioning receiver 80 receives position information from satellites 58 over position information streams 56 at antenna 82. Receiver 84 processes the position information to extract ephemeris, almanac, and clock correction data. Controller 86 receives the position information and, optionally, directly computes a vehicle position. These calculations performed by controller 86 may use data or operational software stored in memory 88. The vehicle position derived from information received or computed by mobile positioning receiver 80 is passed to processor 110 to be included in messages sent to platform 52. Alternatively, sensors 112, such as an inertial navigation sensor, a dead-reckoning sensor, or a roadside positional tag reading device, generate vehicle position.

Mobile voice communications device 90 includes antenna 92, transceiver 94, and handset 96. Mobile voice communications device 90 receives information related to the communications service provider of mobile unit 12 at antenna 92. This information, such as an MSCID, SID, SWID, NPA, RAP, TLDN, or other information associated with the communications service provider passes through transceiver 94 over link 114 to processor 110 to be included in messages sent to platform 52. Alternatively, this information passes through bus drivers 116 and a modem or dual tone multifrequency (DTMF) coder/decoder 118 to processor 110.

Antenna 92 and transceiver 94 also receive calls placed by caller 70 and delivered to mobile unit 12, and place calls initiated at mobile unit 12. The user of mobile unit 12 communicates with caller 70 over a traditional or hands-free handset 96. The delivered call to mobile unit 12 may be a traditional voice call, a combination of a voice call with embedded or interleaved data, or a call to transfer data to mobile unit 12 over bus drivers 116 and modem or DTMF coder/decoder 118. For example, mobile voice communications device 90 can receive a call over cellular system 15 to download data to processor 110 or attached memory 120. The data to be downloaded can be updates to operational software of mobile unit 12, messages to operator of mobile unit 12, or other information for operation of mobile unit 12. This information can be generated by caller 70 or platform 52.

Data transceiver 100 includes an antenna 102, a transceiver 104, a controller 106, and a memory 108. In operation, data transceiver 100 communicates data using data communication network 50. For example, processor 110 generates an out of coverage notification in response to a loss of communication with communications service provider as indicated by mobile voice communication device 90. Controller 106 formats the notification for transmission and transceiver 104 transmits the notification over antenna 102. A similar out of service notification may be generated upon detection by processor 110 of a power down of mobile unit 12.

Data transceiver 100 also receives data from data communication network 50 at antenna 102, and passes this data through transceiver 104 and controller 106 to processor 110. For example, data transceiver 100 can receive priority data from platform 52 and pass this data to processor 110. Therefore, data transceiver 100 provides data transmission and reception capabilities over data communication network 50 and directly links this information to processor 110.

Processor 110 manages the communicating, processing, locating, and reporting features of mobile unit 12. Memory 120 contains programs, maps, databases, and other information used by processor 110 to perform its functions, such as cellular coverage maps. Memory 120 can be random access memory (RAM), read-only memory (ROM), CD-ROM, removable memory devices, or any other device that allows storage or retrieval of data. Processor 110 and controllers 86 and 106 as well as memories 88, 108 and 120, may be separate or integral components of mobile unit 12. Mobile unit 12 contemplates any arrangement, processing capability, memory allocation, or task assignment between mobile positioning receiver 80, mobile voice communications device 90, data transceiver 100, processor 110, and memory 120.

Processor 110 is also coupled to input device 122 and output device 124. Input device 122 is a keypad, touch screen, voice recognition software and related hardware, or other device that can accept information, such as digital data or audible commands. Output device 124 conveys information associated with the operation of mobile unit 12, including digital data, visual information, or audio information. Both input device 122 and output device 124 include fixed or removable storage media, such as magnetic computer disks, CD-ROM, or other suitable media to both receive output from and provide input to processor 110 or memory 120. For example, information correlating position of mobile unit 12 to identifiers of communications service providers is provided to input device 122 and stored in memory 120.

Processor 110 collects various pieces of information from positioning receiver 80, mobile voice communications device 90, sensors 112, memory 120, input device 122, or other sources, and distills this information into messages for transmission over data transceiver 100 to platform 52. Processor 110 and data transceiver 100 can report other information to platform 52 or caller 70. This information originates from sensors 112, such as engine sensors, truck-trailer sensors, security monitors, on-board positioning sensors or other devices generating information on the status or condition of mobile unit 12, an associated vehicle, or its operator. The operator can also compose a data message for transmission using input device 122.

Components of mobile unit 12 shown in FIG. 2 are packaged in one or more housings. Mobile unit 12 mounts to a vehicle or object to be tracked. Mobile unit 12 can also be packaged as a portable, hand-held device that provides personal timing, locating, communicating, and reporting functions. For example, police, firefighters, rescue teams, service and delivery personnel, individuals that may change forms of transportation, or other persons requiring portable communications can use a hand-held mobile unit 12.

Figure 4:
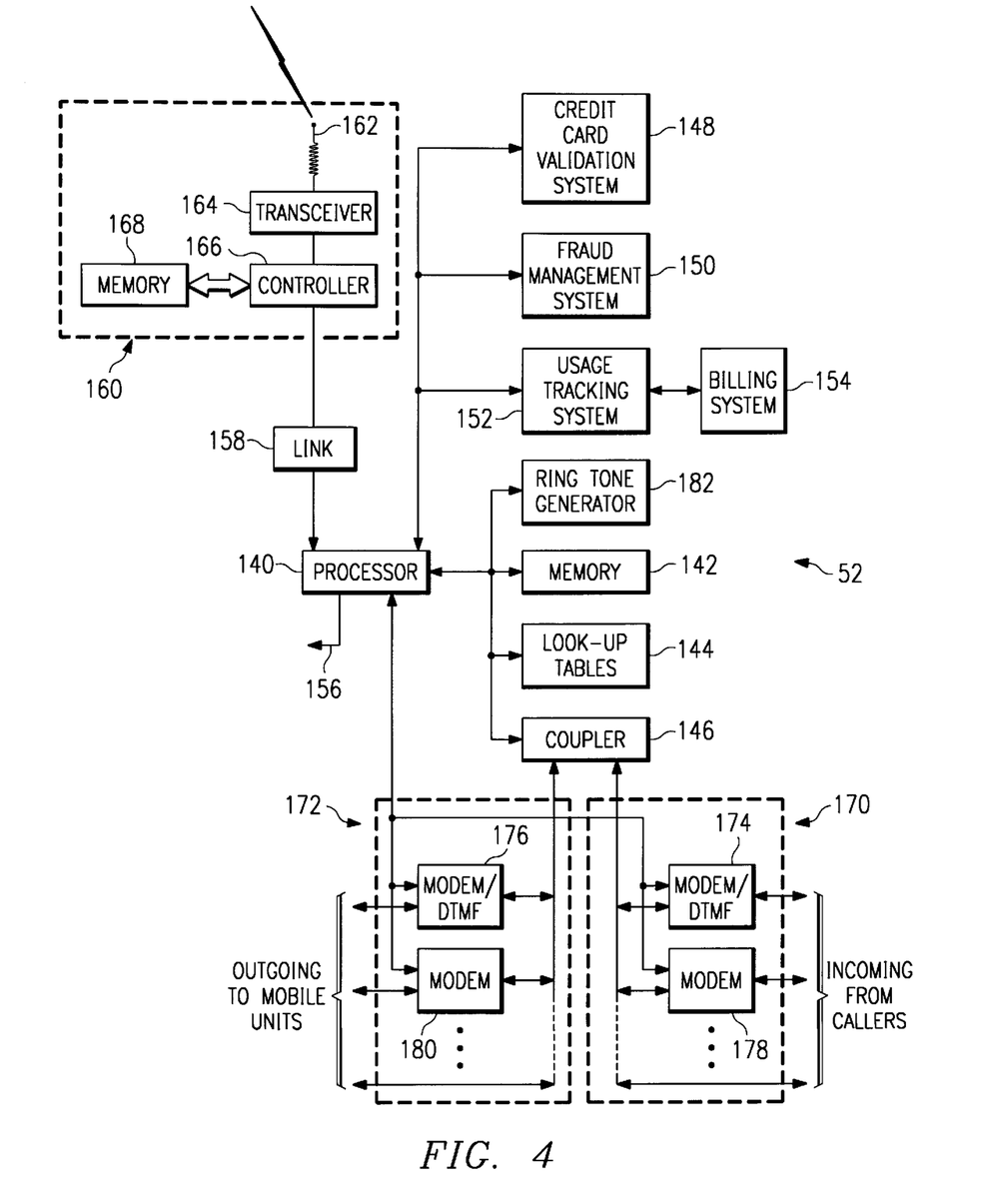
FIG. 4 is a schematic representation of a telecommunication platform in the communication system.

FIG. 4 illustrates a block diagram of platform 52 that delivers calls to and exchanges data with mobile unit 12 in response to the status of mobile unit 12. Platform 52 includes a processor 140 coupled to memory 142, look-up tables 144, and coupler 146. Processor 140 is also coupled to credit card validation system 148, fraud management system 150, usage tracking system 152, and billing system 154. Processor 140 communicates with other similarly functioning platforms in a distributed platform embodiment or with other telecommunication switches using communications link 156. Communications link 156 can be a portion of the nation-wide SS7 backbone that interconnects components of PSTN 72, or any other dedicated or switched communications link.

Platform 52 is also coupled to data transceiver 160 over link 158. Data transceiver 160 can be integral to or separate from platform 52. For example, data transceiver 160 can be disposed at a central messaging center of data communication network 50 which is remotely located from platform 52. Link 158 can be any appropriate dedicated or switched link that supports communication of data between platform 52 and data transceiver 160.

Data transceiver 160 is similar in construction and operation to data transceiver 100 in mobile unit 12. Data transceiver 160 includes antenna 162, transceiver 164, controller 166, and memory 168. In operation, data transceiver 160 receives data messages from and transmits data messages to mobile unit 12 using data communication network 50. In a typical configuration, data transceiver 160 receives messages from many mobile units 12 and requires a higher capacity design than data transceiver 100 in mobile unit 12. Antenna 162 receives an incoming report, notification, or data (generally referred to as a message) from mobile unit 12 and passes the message to transceiver 164. Controller 166 receives the message from transceiver 164 and passes the message to processor 140 over link 158. Controller 166 accesses operational software and other data stored in memory 168 to control the operation of data transceiver 160. Data transceiver 160 also receives data from platform 52 using link 158, and transmits this data to mobile unit 12 using data communication network 16. The data transmitted by data transceiver 160 can be broadcast without the need for location information of mobile unit 12, or data transceiver 160 can use location information of mobile unit 12 stored at platform 52 to communicate the data.

Coupler 146 in platform 52 couples links 170 with links 172, also referred to in the singular as link 170 and link 172. Links 170 couple platform 52 with PSTN 72, and other switches to allow callers 70, desiring to place a call to mobile unit 12, to connect with platform 52. Links 172 couple platform 52 with mobile unit 12. Links 170 and links 172 can include modem and DTMF coder/decoders 174 and 176 or modems 178 and 180. Platform 52 supports voice calls, voice calls with embedded or interleaved data, and partially or fully encoded data calls using modem/DTMF 174 and 176 or modem 178 and 180. Coupler 146, under the direction of processor 140, couples link 170 with link 172 to complete delivery of a call from caller 70 to mobile unit 12. Coupler 146, link 170, and link 172 include the appropriate hardware and software to control the dialing and call answering capabilities of platform 52.

Calls to and from mobile unit 12 pass through coupler 146. Processor 140 controls and monitors coupler 146 and records call information, such as the number and length of calls to each mobile unit 12, which is recorded in usage tracking system 152. In this manner, billing system 154 generates bills for use of platform 52. If several mobile units 12 are associated with a particular company or organization, such as a fleet of trucks, billing system 154 generates a consolidated bill for all calls to and from mobile units 12 installed in the fleet of trucks.

A fraud management system 150 performs an optional security handshake protocol between platform 52 and mobile unit 12 or between platform 52 and caller 70. This security handshake ensures that only authorized calls are made to and from mobile unit 12 over link 172. If the security handshake is not executed correctly, then processor 140 disconnects the call through coupler 146, which greatly reduces costs resulting from unauthorized use of cellular system 15. Fraud management system 150 can also perform a similar security handshake on calls received from caller 70 at link 170. In addition to fraud management, credit card validation system 148 can validate credit card calls made to platform 52, either from caller 70 or mobile unit 12. Platform 52 can either perform or not perform either a security handshake or credit card validation on communications with either caller 70 or mobile unit 12.

In operation, data transceiver 160 receives a message from mobile unit 12. The message from mobile unit 12 may include the status of mobile 12 (e.g., active, out of coverage, out of service), the identification of mobile unit 12, the identification (e.g., SID, MSCID, SWID) of cellular system 15 currently servicing mobile unit 12, geographic location of mobile unit 12, or any other information regarding the status or location of mobile unit 12. Data transceiver 160 passes the message to processor 140 of platform 52 using link 158. Processor 140 validates the message using fraud management system 150 and logs the message for usage tracking system 152 and billing system 154. Processor 140 stores the message time-stamped and indexed by mobile unit identification number in memory 142. Processor 140 also stores information on mobile unit 12 in a status table maintained in memory 142 and described below in more detail with reference to FIG. 6. Processor 140 can communicate the message using link 156 to other switches or other platforms 52 in a distributed platform system.

Platform 52 receives a call for mobile unit 12 on link 170. A caller 70 establishes a connection with link 170 by placing a call, such as a 1+800 call, to platform 52 or by placing a call to other switches which then direct the call to platform 52. Caller 70 enters a telephone number or other mobile unit identification number, which is decoded by modem/DTMF 174 or modem 178 and passed to processor 140. Processor 140 validates the mobile unit identification number and upon validation accesses status information in memory 142 indexed by the mobile unit identification number.

Depending on the status of mobile unit 12 indicated in memory 142, processor 140 performs additional processing using look-up tables 144 to determine a proper dialing number and method to establish communications with mobile unit 12. Processor 140 directs coupler 146 to place a call to mobile unit 12 using link 172. Upon establishing a communications link with mobile unit 12, coupler 146 couples link 170 connecting caller 70 with link 172 connecting mobile unit 12. If the status of mobile unit 12 is out of coverage or out of service, platform 52 ceases attempts to communicate with mobile unit 12 until receiving a new message that mobile unit 12 is now available.

Platform 52 may also receive alerts, notifications, data, or other messages to be delivered to mobile unit 12. This information may be received over link 170 or generated internally by platform 52. Depending on the size and priority of the data to be delivered to mobile unit 12, platform 52 may communicate this data using cellular telephone system 15 and link 172 or using data transceiver 160. In a particular embodiment, priority data may be communicated using data transceiver 160 when memory 142 indicates that the status of mobile unit 12 is out of coverage.

Figure 5A:
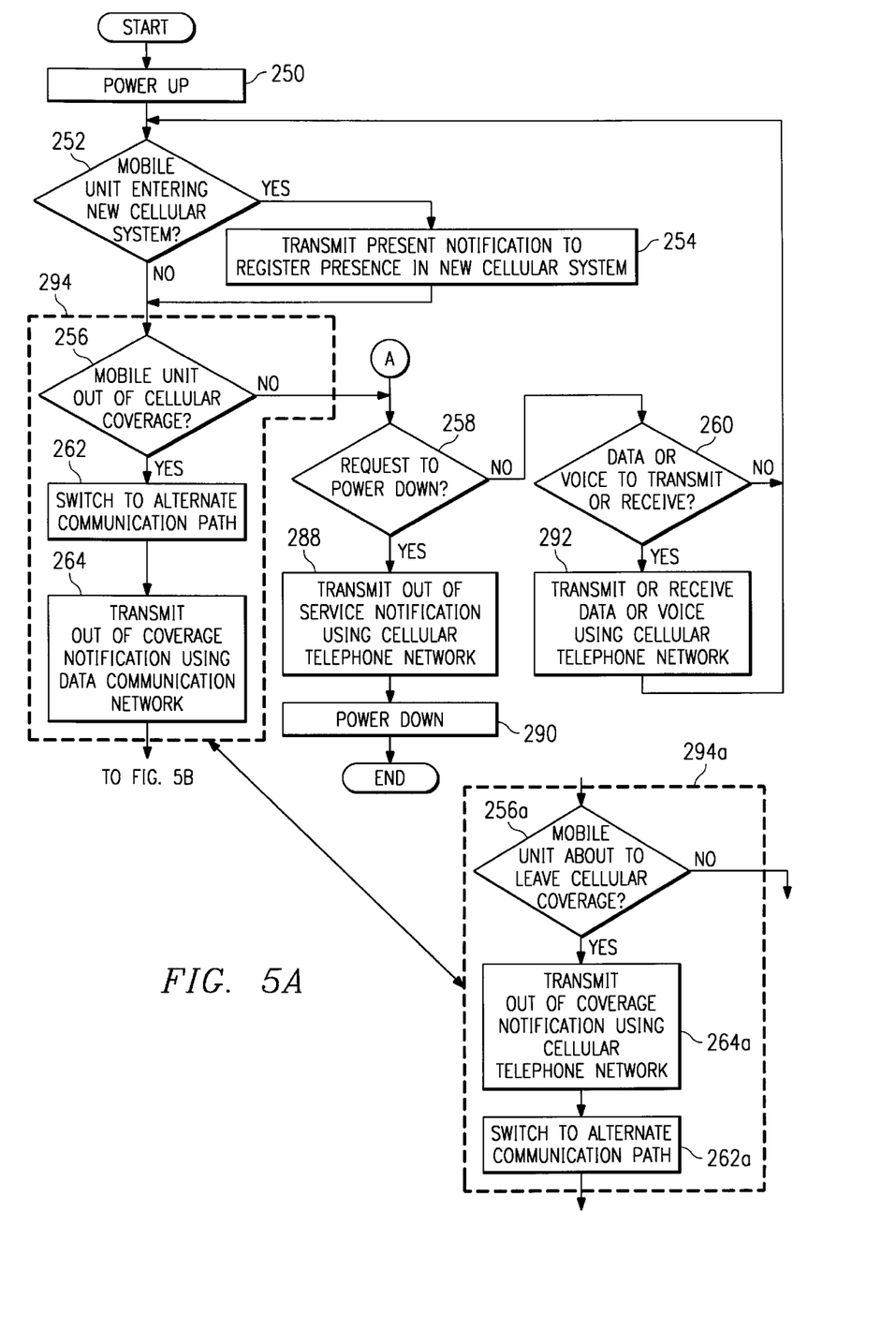
FIGS. 5A–5B illustrate a flowchart for the operation of the mobile unit in the communication system.
Figure 5B:
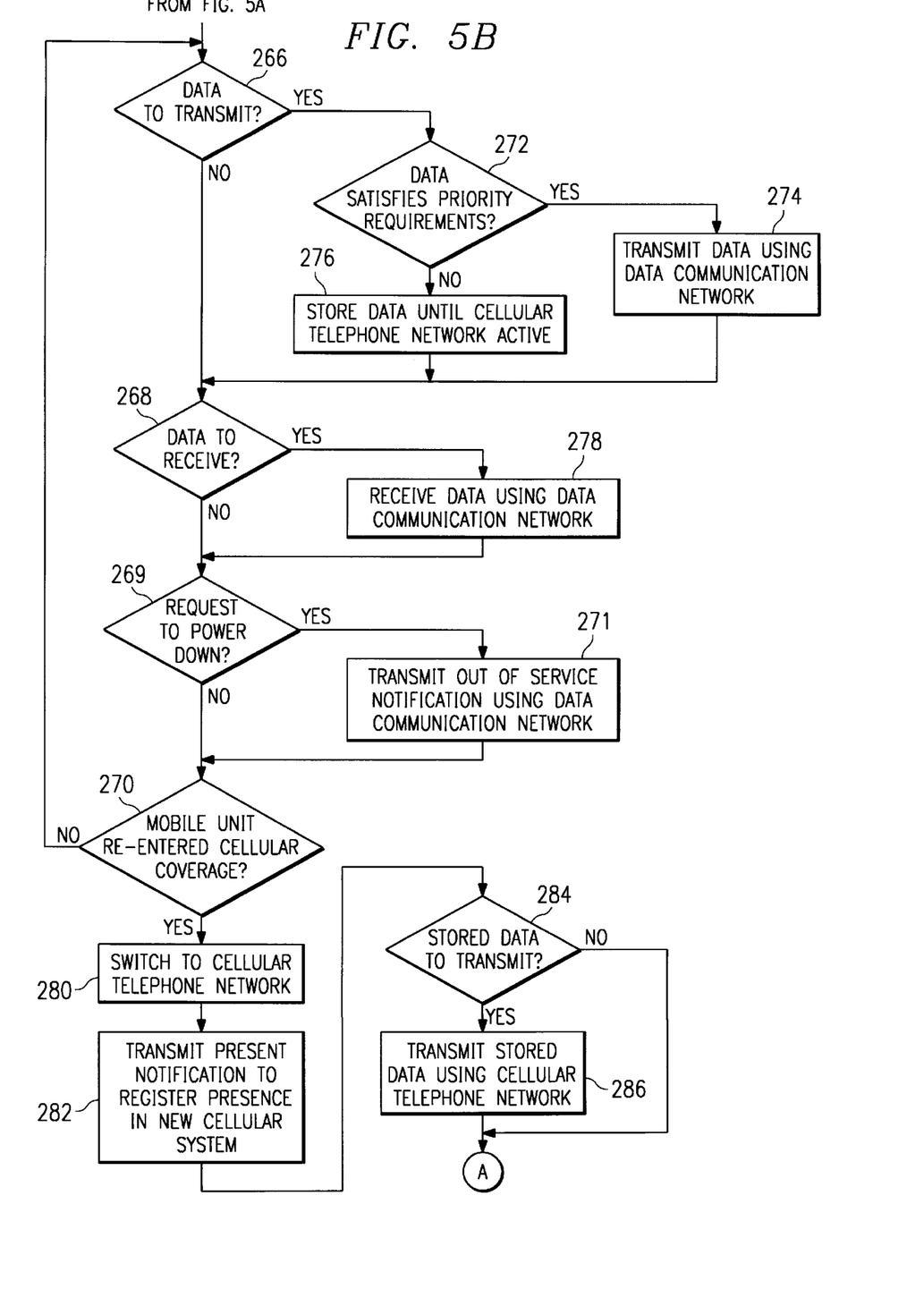

FIGS. 5A–5B are flow diagrams for transmitting an out of coverage or out of service notification from mobile unit 12.

The method begins at block 250 where mobile unit 12 powers up. The power up procedure may include reading the OHMS to determine whether mobile unit 12 is located within a cellular system. If mobile unit 12 is within a cellular system, it issues a present notification to notify platform 52 that it is in service, and in which SID it is located. If mobile unit 12 is out of cellular coverage, it may transmit an out of coverage notification to platform 52 using data communication network 50 to notify platform 52 that it is back in service, but not in cellular coverage. However, prior to the last power down, mobile unit 12 may have already transmitted an out of coverage notification. If so, platform 52 knows that mobile unit 12 is out of cellular coverage, and mobile unit 12 need not transmit another out of coverage notification. Mobile unit 12 uses processor 110 and memory 120 to maintain a record of messages and notifications sent to platform 52 to avoid unnecessary messages.

The method proceeds to block 252 to determine whether mobile unit 12 is entering a new cellular system. If mobile unit 12 is entering a new cellular system, block 254 transmits a present notification to register the presence of mobile unit 12 in the new cellular system. After the transmission or if mobile unit 12 was not entering a new cellular system at block 252, the method proceeds to block 256 where it queries whether mobile unit 12 out of cellular coverage.

Mobile unit 12 may use the strength of the OHMS signal in order to detect when it is leaving or entering coverage of a cellular system. Alternatively or in addition to the OHMS signal strength method, the present invention may use a database map function to monitor or verify when mobile unit 12 is leaving cellular coverage. For example, two adjacent cellular systems may not quite intersect, thereby leaving a momentary lapse in cellular coverage for a short distance. In such a case, when the OHMS signal drops below the required threshold, mobile unit 12 may verify whether it is leaving cellular coverage against a cellular system coverage map stored in memory 120 of mobile unit 12. If the cellular coverage map indicates that mobile unit 12 should be entering a new cellular system, mobile unit 12 may not issue the out of coverage notification for a certain time, allowing it to enter the nearby cellular system. If after a predetermined time mobile unit 12 has still not entered a new system, it may then issue the out of coverage notification. This may further reduce costs by preventing mobile unit 12 from issuing an out of coverage notification followed momentarily by a present notification.

If mobile unit 12 does not detect that it has left cellular coverage, the method proceeds to block 258 where it determines whether the power down procedure of mobile unit 12 has been initiated. If not, the method proceeds to block 260 where it queries whether mobile unit 12 has data or voice messages to transmit or receive. If there are no messages to transmit or receive, the method returns to block 252. In this manner, the method operates to continuously monitor the queries represented by blocks 252, 256, 258, and 260.

Returning to block 256, if mobile unit 12 detects that the signal strength of the OHMS has passed below the predetermined threshold (which may vary from one mobile unit 12 to another) and/or determined that mobile unit 12 has moved outside the cellular coverage map, the mobile unit 12 determines a loss of communication and switches to the alternate communication path supported by data transceiver 100 and data communication network 50 at block 262. The method then proceeds to block 264 and transmits an out of coverage notification using data communication network 50.

The method continues to block 266 (FIG. 5B) and determines whether mobile unit 12 has data to transmit. If there is no data to transmit, mobile unit 12 determines whether there is data to receive at block 268. If there is no incoming data to receive, mobile unit 12 determines if a power down procedure has been initiated at block 269. If mobile unit 12 has not initiated the power down procedure, the method proceeds to block 270 and queries whether mobile unit 12 has reentered cellular coverage. Again, this determination may be made by monitoring the OHMS signal strength, by monitoring information stored in a database map function, or by using a combination of the two. If mobile unit 12 is not reentering cellular coverage, the method loops back to block 266 and continues to monitor the queries of blocks 266, 268, 269, and 270.

If mobile unit 12 has data to transmit at block 266, mobile unit 12 queries whether the data satisfies predetermined priority requirements at block 268. A priority system may be implemented as a result of higher costs or capacity constraints associated with transmitting or receiving data over data communication network 50. If the data satisfies the priority requirements, mobile unit 12 transmits the data using a data transceiver 100 operating with data communication network 50 at block 274. If the data does not satisfy the priority requirements, mobile unit 12 stores the data in memory 120 of mobile unit 12 until a cellular system provides service to mobile unit 12 at block 276.

After the data is either transmitted at block 274 or stored at block 276, the method continues to block 268. If there is incoming data to receive at block 268, mobile unit 12 receives the data using data transceiver 100. No priority check is necessary at mobile unit 12 for incoming data, since platform 52 performs this priority check prior to transmission over data communication network 50. After receiving the data, the method proceeds to block 269.

If there is a request to power down at block 269, mobile unit 12 transmits an out of service notification using data transceiver 100 at block 271. Once the out of service notification is transmitted, or if there was no request to power down the method proceeds to block 270.

If mobile unit 12 is reentering cellular coverage at block 270, mobile unit 12 switches to receive service from the cellular telephone network at block 280. Mobile unit 12 transmits a present notification to register its presence in the new cellular system at block 282. As will be discussed with more detail with reference to FIGS. 6 and 7 below, platform 52 may update memory 142 to reflect the new status and location of mobile unit 12. Mobile unit 12 queries whether any data was stored for transmission upon reestablishing cellular service at block 284. If there is stored data to transmit, mobile unit 12 transmits the stored data to platform 52 over the cellular telephone network using cellular transceiver 90 at block 286.

Once the data is transmitted, or if there was no stored data to transmit, the method returns to block 258. If there is data or voice to transmit or receive, the mobile unit 12 transmits or receives the data or voice using the cellular telephone network at block 292, and the method returns to block 252. If mobile unit 12 has initiated the power down procedure, mobile unit 12 transmits an out of service notification using the cellular telephone network at block 288, and powers down at block 290.

In an alternative embodiment, mobile unit 12 may transmit the out of coverage notification before leaving cellular coverage, and therefore before switching to the alternate communication path supported by data communication network 50. A dotted block 294 encloses blocks 256, 262, and 264. A dotted block 294a encloses blocks 256a, 262a, and 264a. Replacing the method steps enclosed in dotted block 294 with the method steps enclosed in dotted block 294a illustrates this alternate embodiment. At block 256a, mobile unit 12 queries whether it is about to leave cellular coverage. In the previously discussed embodiment, mobile unit 12 detected when it had left cellular coverage by monitoring the OHMS signal strength or accessing geographic coordinates of cellular system coverage. In this alternate embodiment, mobile unit 12 monitors the OHMS signal for a strength that is some predetermined amount more than the threshold for successful cellular communication. A signal strength below this amount indicates that mobile unit 12 is about to leave cellular coverage. Accordingly, mobile unit 12 transmits the out of coverage notification using the still active cellular telephone network at block 264a, and switches to the alternate communication path supported by data communication network 50 at block 262a. If mobile unit 12 is not about to leave cellular coverage at block 256a, the method proceeds to block 258.

In this manner, the alternative embodiment may allow additional cost savings by transmitting the out of coverage notification using the cellular telephone network rather than data communication network 50. This may eliminate the need for an alternate communication path altogether. It may remain advantageous, however, to equip mobile unit 12 with data transceiver 100 for transmission of high priority data while mobile unit 12 is out of cellular coverage, but still in service.

Dashed lines 15a, 16a, 17a, and 18a in FIG. 1 are representative of the OHMS signal strength that mobile unit 12 monitors in the alternate embodiment to determine whether it is about to leave cellular coverage provided by cellular systems 15, 16, 17, and 18, respectively. Dashed lines 15a–18a are drawn inside the coverage areas described by cellular systems 15–18 to indicate that mobile unit 12 monitors for a higher OHMS signal strength. FIG. 1 illustrates a perceived gap 42 that may exist between adjacent cellular systems 17 and 18 as a result of the heightened OHMS signal strength thresholds. This may increase costs due to an out of coverage notification transmitted when mobile unit 12 reaches line 17a followed shortly thereafter by a present notification when mobile unit 12 reaches line 18a. Whether such an embodiment is used, therefore, may depend on relative costs of cellular communication versus communication using data communication network 50.

Figure 6:
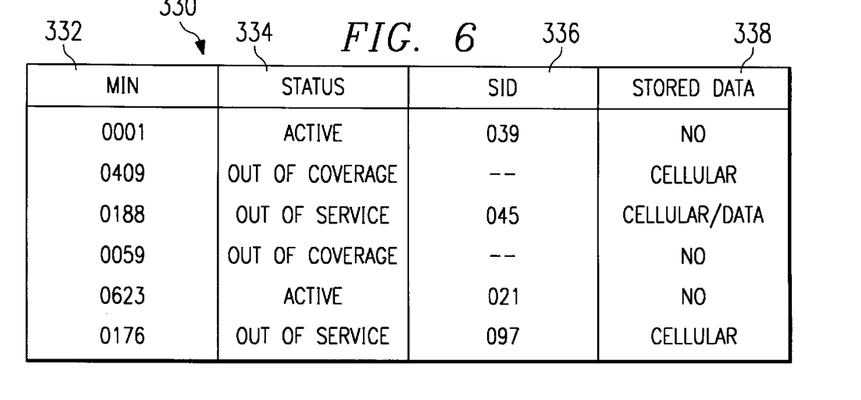
FIG. 6 illustrates a table maintained by the platform that stores information on the mobile units.

FIG. 6 illustrates the information associated with particular mobile units 12 that may be maintained and updated as status table 330 stored at platform 52. Column 332 lists the mobile identification number ("MIN") or other appropriate identifier for each particular mobile unit 12. Column 334 maintains the status of each mobile unit 12. Options for status include active, out of coverage, or out of service. Column 336 stores the system identification number ("SID") or other appropriate identifier associated with the particular cellular system in which mobile unit 12 is presently located. Column 338 reflects the existence and priority of any stored data associated with mobile unit 12.

Stored data may have different priorities as a result of different costs and capacity restraints associated with transmission over the cellular telephone network as compared to transmission over data communication network 50. For example, transmission over the cellular telephone network may be cheaper than transmission over data communication network 50. Accordingly, platform 52 may transmit low priority data only over the cellular telephone network, and low priority data or messages set for transmission while mobile unit 12 is not in cellular coverage may be stored for later transmission upon reestablishment of cellular coverage. Platform 52 may transmit high priority data, on the other hand, using the cellular telephone network when available, but in the alternative using data communication network 50. Column 338 of table 330 indicates this distinction by categorizing stored data. For example, high priority data is stored as cellular/data, indicating that platform 52 should transmit this data as soon as the cellular telephone network or data communication network 50 is available. Low priority data is designated cellular, indicating that platform 52 should transmit this data only when the cellular telephone network is available.

Figure 7:
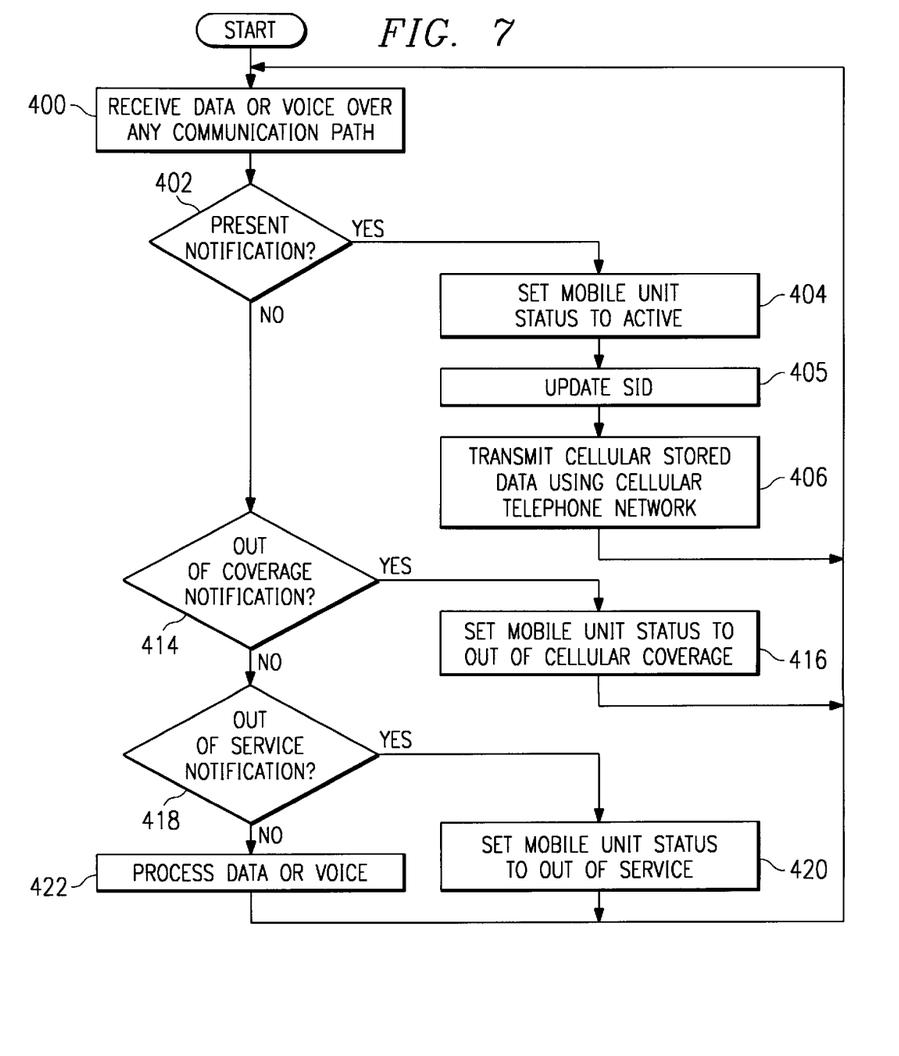
FIG. 7 illustrates a flowchart for the operation of the platform in the communication system.

FIG. 7 illustrates a method by which platform 52 maintains a record of the location, status, and existence and priority of stored data for various mobile units 12. This information may be stored in memory 142 associated with platform 52. Memory 142 may also maintain a chronological listing of communications with mobile units 12, or it may maintain one entry per mobile unit 12 that contains only the current location and status information. A chronological listing could be used to facilitate route tracking of mobile units 12 based on the chronological record of registrations in cellular systems across the nation.

The method of FIG. 7 begins at block 400 where platform 52 receives a data or voice message over any of the available communication paths. Platform 52 queries whether the message is a present notification at block 402. If the message is a present notification, platform 52 sets or confirms the status of mobile unit 12 to active at block 404, and updates column 336 of table 330 to reflect the new SID in which mobile unit 12 is located at block 405. Additionally, platform 52 may extract any other location or status information embedded in the present notification. Platform 52 transmits data designated as cellular or cellular/data to the particular mobile unit 12 using the cellular telephone network at 406, and the method returns to block 400.

If the message is not a present notification at block 402, platform 52 queries whether the message is an out of coverage notification at block 414. If so, platform 52 updates column 336 of table 330 to reflect that mobile unit 12 is out of coverage at block 416, and the method returns to block 400.

If the message is not an out of coverage notification at block 414, platform 52 determines whether the message is a request to power down or an out of service message at block 418. If so, platform 52 updates the status of mobile unit 12 in column 334 of table 330 to out of service at block 420, and the method returns to block 400.

If the message is not an out of service notification at block 418, platform 52 processes the data or voice message in an appropriate manner at block 422. Such data or voice information may include, for example, cellular calls from a driver to personnel at a host or monitoring station, data regarding the specific GPS or Loran-C location of the truck, data regarding the status of cargo, or estimated arrival times or route changes. After the data is processed at block 422, the method returns to block 400.

Figure 8:
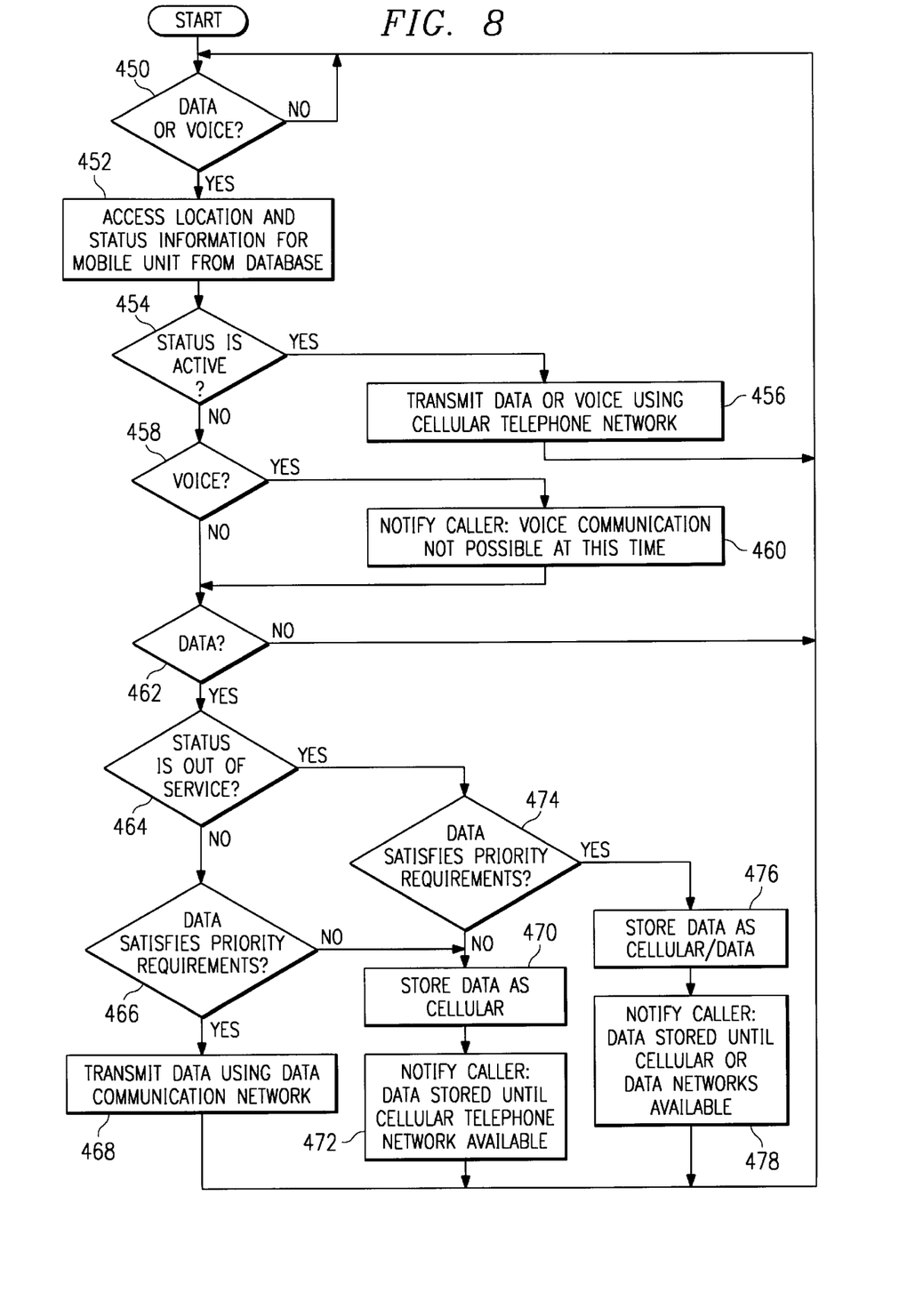
FIG. 8 illustrates a flowchart for processing messages received at the platform from the mobile units.

FIG. 8 illustrates a flow diagram of a method for platform 52 to determine whether to transmit data or voice to a particular mobile unit 12. The method begins at block 450 where platform 52 queries whether there is data or voice to transmit to mobile unit 12. If there is no data or voice to transmit, platform 52 continuously monitors for data or voice to transmit by returning to block 450. If there is data or voice to transmit, platform 52 accesses the location and status information for the particular mobile unit 12 from table 330 at block 452, and queries whether mobile unit 12 is active at block 454. If mobile unit 12 is active, platform 52 transmits the data or voice using the cellular telephone network at block 456.

If mobile unit 12 is not active at block 454, platform 52 queries at block 458 whether there is voice information to transmit to mobile unit 12, for example, information to establish and conduct a voice call. If so, platform 52 notifies caller 70 that voice communication is not possible at this time (since mobile unit 12 is out of cellular coverage or out of service) at block 460. Alternatively, mobile unit 12 or platform 52 may be equipped with an answering machine, voice messaging, or voice mail system to allow caller 70 to leave a voice message for storage until the status of mobile unit 12 is out of coverage or active, depending on the priority of the message.

After caller 70 is notified at block 460, or if there is no voice to transmit at block 458, platform 52 queries whether there is data to transmit at block 462. If there is no data to transmit, the method returns to block 450. If there is data to transmit, platform 52 queries whether the status of mobile unit 12 is out of service at block 464. If mobile unit 12 is not active (block 454) and not out of service (block 464) platform 52 queries whether data to be transmitted to mobile unit 12 satisfies the priority requirements at block 466. If the data satisfies the priority requirements, platform 52 transmits the data using data communication network 50 at block 468 and returns to block 450. If, on the other hand, the data does not satisfy the priority requirements, platform 52 stores the data in memory 142 as cellular data at block 470, and notifies caller 70 or other user that the data is stored until the cellular telephone network is available at block 472. The method then returns to block 450.

Returning to block 464, if the status of mobile unit 12 is out of service, platform 52 queries whether the data satisfies the priority requirements at block 474. If the data does not satisfy the priority requirements, the method proceeds through blocks 470 and 472 as described above and then returns to block 450. If the data satisfies the priority requirements, platform 52 stores the data as cellular/data at block 476, and notifies caller 70 or other user that the data is stored until data communication network 50 or the cellular telephone network is available for communication with mobile unit 12 at block 478. The method then returns to block 450.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication system comprising:
   a mobile unit coupled to a cellular telephone network and a data communication network, the mobile unit operable to transmit, using the data communication network, a message that the mobile unit will no longer receive service from the cellular telephone network; and
   a platform coupled to the cellular telephone network and the data communication network, the platform operable to receive the message that the mobile unit will no longer receive service from the cellular telephone network and, in response, to cease attempts to communicate with the mobile unit using the cellular telephone network.

2. The system of claim 1, wherein:
   the mobile unit comprises a satellite data transmitter coupled to the data communication network; and
   the platform comprises a satellite data receiver coupled to the data communication network.

3. The system of claim 1, wherein the message that the mobile unit will no longer receive service from the cellular telephone network includes the current geographic position of the mobile unit.

4. The system of claim 1, wherein the message that the mobile unit will no longer receive service from the cellular telephone network includes a system identification number of the cellular telephone system most recently serving the mobile unit.

5. The system of claim 1, wherein the platform is further operable to transmit priority data to the mobile unit using the data communication network after receiving the message that the mobile unit will no longer receive service from the cellular telephone network.

6. A mobile unit comprising:
   a cellular telephone coupled to a cellular telephone network;
   a data transmitter coupled to a data communication network; and
   a processor coupled to the cellular telephone and the data transmitter, the processor operable to determine that the cellular telephone will no longer receive service from the cellular telephone network and, in response, to direct the data transmitter to transmit a message that the mobile unit will no longer receive service from the cellular telephone network.

7. The mobile unit of claim 6, wherein the processor determines that the cellular telephone will no longer receive service from the cellular telephone network when the cellular telephone reports a loss in communication with the cellular telephone network.

8. The mobile unit of claim 6, further comprising:
   a positioning device operable to generate a geographic position of the mobile unit; and
   a memory operable to store a cellular coverage map, wherein the processor determines that the cellular telephone will no longer receive service from the cellular telephone network by comparing the geographic position of the mobile unit to the cellular coverage map.

9. The mobile unit of claim 6, wherein the processor determines that the cellular telephone will no longer receive service from the cellular telephone network when the processor receives a request to power down the mobile unit.

10. The mobile unit of claim 6, wherein the data transmitter comprises a satellite data transmitter.

11. The mobile unit of claim 6, wherein the data transmitter is further operable to transmit priority data using the data communication network after transmitting the message that the mobile unit will no longer receive service from the cellular telephone network.

12. The mobile unit of claim 6, further comprising a positioning device operable to generate a geographic position of the mobile unit, wherein the geographic position of the mobile unit is included in the message that the mobile unit will no longer receive service from the cellular telephone network.

13. The mobile unit of claim 6, wherein the message that the mobile unit will no longer receive service from the cellular telephone network includes a system identification number of the cellular telephone system most recently serving the mobile unit.

14. A telecommunication platform comprising:
- a first link coupled to a cellular telephone network and operable to communicate with a mobile unit equipped with a cellular telephone;
- a second link operable to receive a call to be delivered to the mobile unit;
- a data receiver coupled to a data communication network, the data receiver operable to receive a message generated by the mobile unit indicating that the mobile unit will no longer receive service from the cellular telephone network; and
- a processor coupled to the data receiver, the processor operable to prevent delivery of the call to the mobile unit upon reception of the message that the mobile unit will no longer receive service from the cellular telephone network.

15. The telecommunication platform of claim 14, wherein the message that the mobile unit will no longer receive service from the cellular telephone network indicates that the mobile unit has entered an area not covered by the cellular telephone network.

16. The telecommunication platform of claim 14, wherein the message that the mobile unit will no longer receive service from the cellular telephone network indicates that the mobile unit has powered down.

17. The telecommunication platform of claim 14, wherein the data receiver comprises a satellite data receiver.

18. The telecommunication platform of claim 14, further comprising a data transmitter coupled to the data communication network, the data transmitter operable to transmit priority data to the mobile unit using the data communication network after receiving the message that the mobile unit will no longer receive service from the cellular telephone network.

19. The telecommunication platform of claim 14, wherein the message that the mobile unit will no longer receive service from the cellular telephone network includes a system identification number of the cellular telephone system most recently serving the mobile unit.

20. A method for communicating at a mobile unit, the mobile unit comprising a cellular telephone coupled to a cellular telephone network and a data transmitter coupled to a data communication network, the method comprising the following steps performed at the mobile unit:
- determining that the cellular telephone will no longer receive service from the cellular telephone network; and
- transmitting a message that the mobile unit will no longer receive service from the cellular telephone network using the data transmitter and the data communication network.

21. The method of claim 20, wherein the step of determining comprises detecting a loss in communication between the cellular telephone and the cellular telephone network.

22. The method of claim 20, wherein the step of determining comprises detecting a request to power down the mobile unit.

23. The method of claim 20, wherein the step of determining comprises:
- receiving a geographic position of the mobile unit from a positioning device; and
- comparing the geographic position of the mobile unit to a cellular coverage map stored at the mobile unit.

24. The method of claim 20, wherein the data transmitter comprises a satellite data transmitter.

25. The method of claim 20, further comprising the following steps performed after transmitting a message that the mobile unit will no longer receive service from the cellular telephone network:
- receiving data to transmit from the mobile unit to a remote location;
- determining a priority associated with the data; and
- transmitting the data from the mobile unit using the data transmitter and the data communication network in response to the determined priority.

26. The method of claim 20, further comprising:
- receiving a geographic position of the mobile unit from a positioning device; and
- transmitting the geographic position with the indication that the mobile unit will no longer receive service from the cellular telephone network.

27. The method of claim 20, further comprising:
- receiving a system identification number of the cellular telephone system most recently serving the mobile unit; and
- transmitting the system identification number with the indication that the mobile unit will no longer receive service from the cellular telephone network.

28. A method for communicating comprising the following steps performed at a telecommunication platform:
- receiving a call to be delivered to a mobile unit having a cellular telephone coupled to a cellular telephone network;
- receiving, at a data receiver coupled to a data communication network, a message that the mobile unit will no longer receive service from the cellular telephone network; and
- preventing delivery of the call to the mobile unit upon reception of the message that the mobile unit will no longer receive service from the cellular telephone network.

29. The method of claim 28, wherein the message that the mobile unit will no longer receive service from the cellular telephone network indicates that the mobile unit has entered an area not covered by the cellular telephone network.

30. The method of claim 28, wherein the message that the mobile unit will no longer receive service from the cellular telephone network indicates that the mobile unit has powered down.

31. The method of claim 28, wherein the data receiver comprises a satellite data receiver.

32. The method of claim 28, further comprising the following steps performed after receiving a message that the mobile unit will no longer receive service from the cellular telephone network:
- receiving data to transmit to the mobile unit;
- determining a priority associated with the data; and
- transmitting the data to the mobile unit using the data transmitter and the data communication network in response to the determined priority.

* * * * *